Inventor:
Hans Badewitz

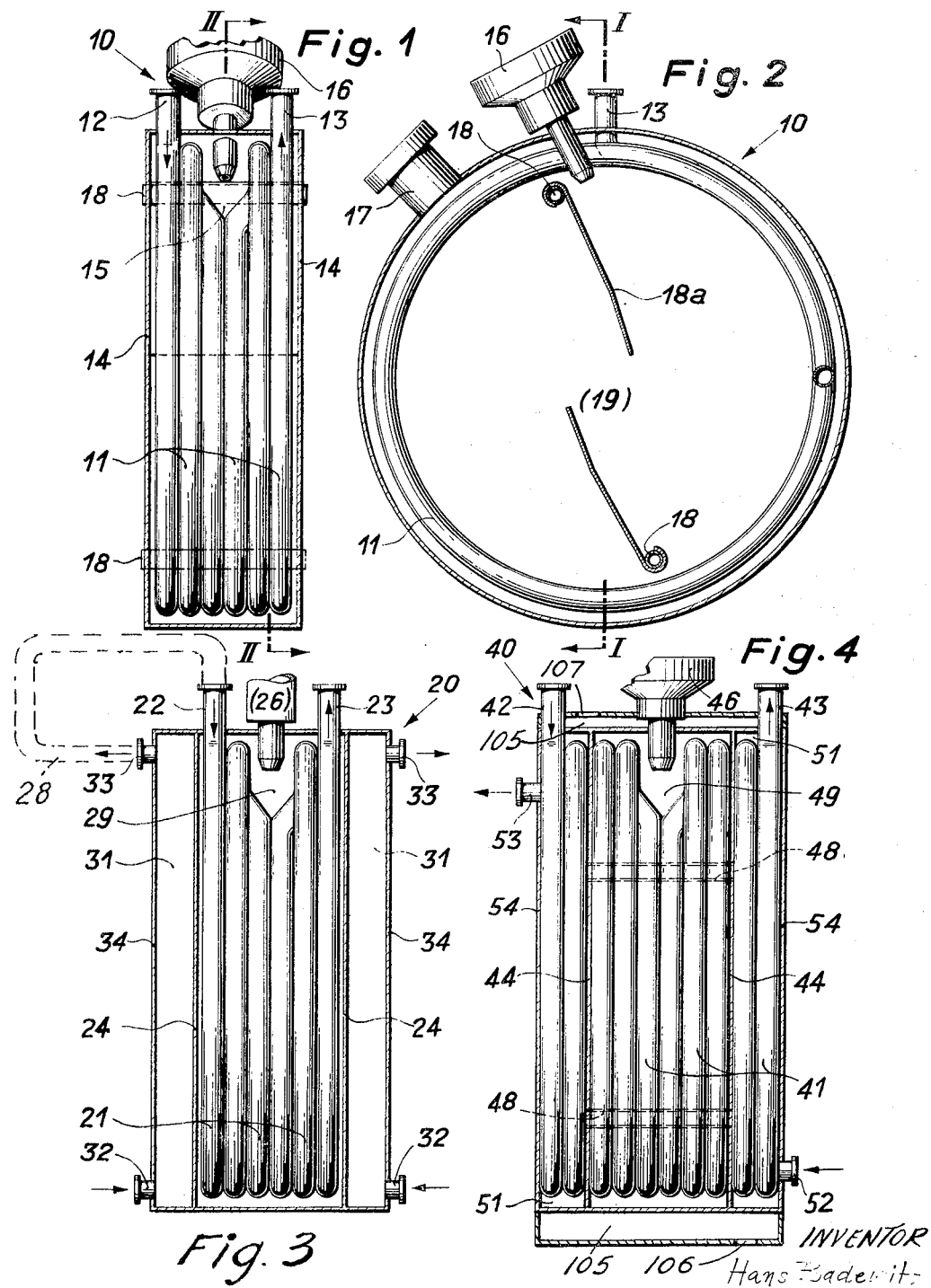

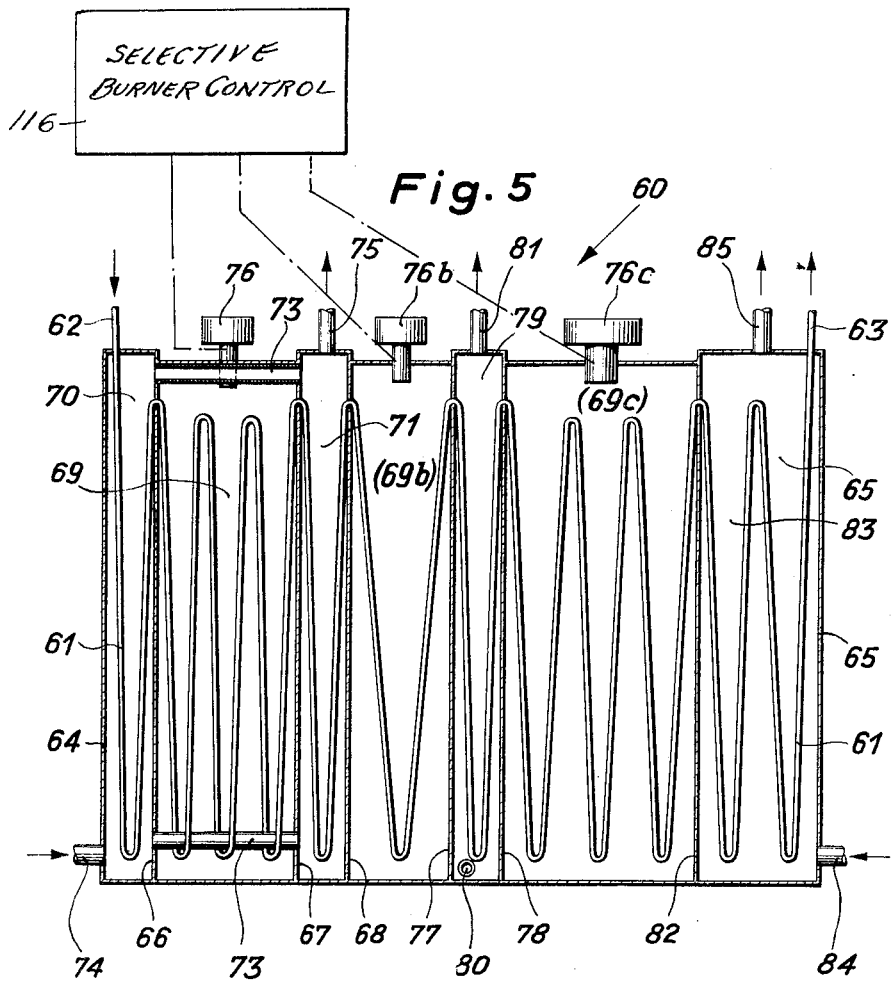

United States Patent Office 3,237,609
Patented Mar. 1, 1966

3,237,609
HEATING APPARATUS WITH THROUGH-FLOW DEVICE
Hans Badewitz, Langestrasse 16, Lage, Lippe, Germany
Filed Nov. 1, 1963, Ser. No. 320,915
Claims priority, application Germany, Nov. 6, 1962,
B 69,517
17 Claims. (Cl. 122—240)

The present invention relates to a heating device for gas and oil heating, and means for the passage of water to be heated therethrough.

It is an object of the invention to provide arrangements according to which a very economical utilization of a heating source is accomplished so that most of the generated heat is transferred to the medium to be heated and losses through dissipation of heat are kept at a minimum.

It is another object of the invention to provide a device which is of high adaptability to varying conditions.

Other objects and advantages of the invention will be apparent from the following detailed description and the accompanying drawings.

Generally speaking, the device comprises a heating vessel with heating means for gas or oil heating so designed that a fire chamber is formed by the closely adjacent windings of a coiled tube, in combination with end walls between which the coil windings are received. At the periphery of the coil, between the windings, an inlet opening is provided for the burner means or the flame, and an outlet for the waste gases, which is in the vicinity of the inlet opening. The burner is so arranged in combination with guide means for the flame that the latter will be made to follow fairly closely the inner circumference of the fire chamber formed by the coil in at least almost a full circle.

The latter feature is accomplished by the arrangement of guide bodies or baffles. If desired, the baffles may be so arranged that a repeated circulation of the flame between inlet and outlet is effected.

The fire chamber enclosed by the coiled tube may be cylindrical, but the cross section may have another closed shape, e.g., oval or square. The inlet for the flame and the outlet for the waste gases may be arranged at different locations at the circumference of the coil whereby the device may be adapted to various requirements of installation.

The heating device may be attached to a wall, suspended from the ceiling, or placed on the floor.

According to one embodiment of the invention, the lateral end walls, which close the openings formed by the coiled tube at each side, are made to form water heating chambers, which in themselves may form water heaters for heating or different other purposes. However, transverse tubes may connect the two ends of the chambers, so that a single chamber is formed for circulation. Finally, the arrangement may be so made that a winding of the coil may pass through the chambers, so that heating of water occurs in these chambers—both by the end walls and through the circulating water current.

Preferably, water for consumption is passed through the coil, which has been pre-heated, if desired, in the first chamber, is then heated in the fire chamber and passed on over to the second chamber, and from there to the consumers. However, it is also possible to provide connecting or bridging pipes between the inlet and outlet, with regulating valves in said pipes, which maintain a minimum circulation of water depending on the passage of water for consumption, so that when no water for consumption is withdrawn, the circulation in the coil transmits such quantites of heat to the end chambers or the heating water circuits that the required heat output will be accomplished.

In accordance with other embodiments of the invention, a further subdivision of the coil body into several heating chambers and water chambers in series arrangement may be provided. By known means of control, adjustment can be made to different requirements of consumption, be it for water of consumption, or heating water, or other heating media e.g., steam or heating oil.

In case the flame is made to pass in several circles over the circumference, it is advantageous to have the water for consumption flow in countercurrent thereto.

In the accompanying drawings, the device according to the invention is illustrated in several embodiments, by way of example, but it should be understood that these illustrations are not given by way of limitation and that many changes in the details can be made without departing from the spirit of the invention.

In the drawings:

FIG. 1 is a schematic showing, in longitudinal section along line 1—1 of FIG. 2, of a device comprising a coiled tube;

FIG. 2 is a cross section of the device shown in FIG. 1, taken along line 2—2;

FIGS. 3 and 4 illustrate two different embodiments;

FIG. 5 shows a multiple chamber heating device, and

Figure 7:
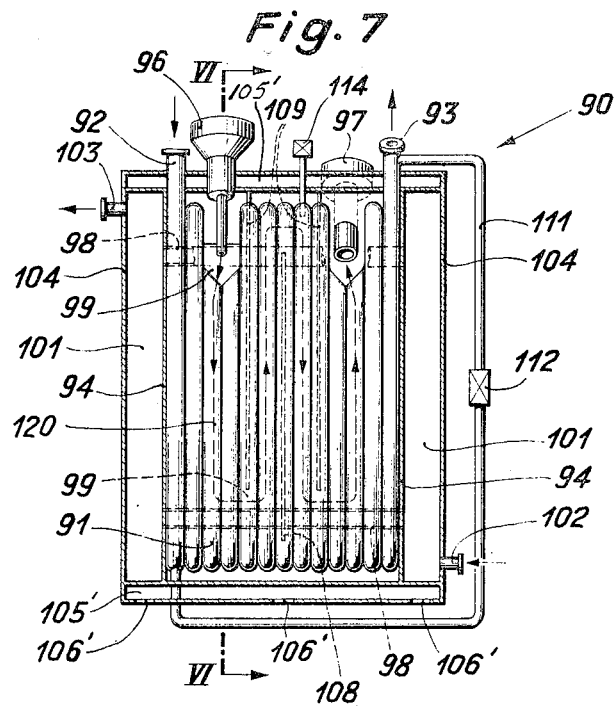
FIGS. 6 and 7 illustrate yet another embodiment with enclosing jacket and a shunting pipe.

Referring now to FIGS. 1 and 2 of the drawing, numeral 10 generally designates the heating device which contains a heating coil 11 consisting of a plurality of closely adjacent windings having an inlet 12 and an outlet 13 for circulating water. The coil is enclosed in end walls 14. Between the bent-away coil windings, openings 15 are provided for accommodating a burner 16 and having a waste gas escape tube 17 arranged therein.

The end walls 14 may be joined together by tubular members 18 which may also serve to support guide plates or baffles 18a for conducting the flame along a circular path. The coils and end walls 14 form together a cylindrical heating chamber 19.

A further embodiment of the heating device is shown in FIG. 3, numeral 20 generally indicating the device. The coil windings are designated by 21, the coil having an inlet tube 22 and an outlet tube 23. The coil windings are received between end walls 24 which are made to form chambers 31 with additional walls 34. Through these chambers, heating water is maintained in circulation, entering the chamber 31 through inlet openings 32 and being discharged by outlet openings 33. The main heating water circuit passes, however, through coil 21 with inlet 22 and outlet 23. Burner 26 is provided within fire chamber 29 in the interior of coil 21. An optional series arrangement between the coil 21 and one of the chambers 31 is shown by a broken-line connecting tube 28 between outlet 33 and inlet 22.

FIG. 4 illustrates a similar device generally designated by 40. There, a coil 41 passes through the fire chamber 49, which is closed by walls 44, as well as through further lateral end chambers 51, closed by outer end walls 54, 42 is the inlet, 43 the outlet, for the coil. Fire chamber 49 is heated by burner 46. The two walls 44 are connected by tubes 48, which are open and connect the two chambers 51 so that these chambers form a common heating circuit with a serial flow between an inlet 52 and an outlet 53. The heating device 40 may be enclosed in a jacket 105 having peripheral air inlet and outlet openings 106, 107.

FIG. 5 shows an embodiment 60, in which several water and fire chambers are arranged in series. The schematically illustrated coil 61 having an inlet 62 and an outlet 63 is closed by two outer end walls 64 and 65. Internal walls 66, 67 and 68 form a fire chamber 69 as well as end chambers 70 and 71. The two latter are connected by pipes 73 for passage of water therethrough and have inlet and outlet openings 74 and 75, respectively. Fire chamber 69 is heated by a burner 76.

A further wall 77 is arranged in spaced relationship from wall 68, whereby a second fiire chamber 69b is formed which is heated by a burner 76b. Another wall 78 forms with wall 77 a water chamber 79 having an inlet 80 and an outlet 81. A wall 82 follows next, which forms with wall 78 yet another fire chamber 69c with a burner 76c provided therein. Finally, another water chamber 83 is formed between wall 82 and end wall 65.

It is understood that the fire chambers 69, 69b and 69c are provided with escape openings for waste gases (not shown) which may be similar to the escape tube 17 of the first embodiment. Chamber 83 has inlet and outlet openings 84, 85 respectively.

There are thus provided several heating circuits which will be explained hereinbelow. One circuit is formed by coil 61 (with the inlet 62 and outlet 63) and the three fire chambers 69, 69b and 69c. By selective ignition of burners 76, 76b and 76c, the heating of the coil can be effected as desired. At 116, means are schematically shown for selectively operating the burner elements 76, 76b and 76c (connected thereto by dot-dash lines) which are provided in the respective fire-chamber compartments 69, 69b and 69c.

However, a separate heating circuit is formed by water chambers 70 and 71 (having inlet opening 74 and outlet opening 75) which are likewise heated by burner 76. The water chamber 79 between fire chambers 69b and 69c can be heated up selectively from said fire chambers, whereas water chamber 83 is only heated from fire chamber 69c. All the water chambers are, moreover, heated by means of the coil 61 passing therethrough.

Thus, by appropriate ignition of burners 76, 76b and 76c, there is a possibility of selectively heating the chambers listed above and to adapt the system to any required condition.

Figure 6:
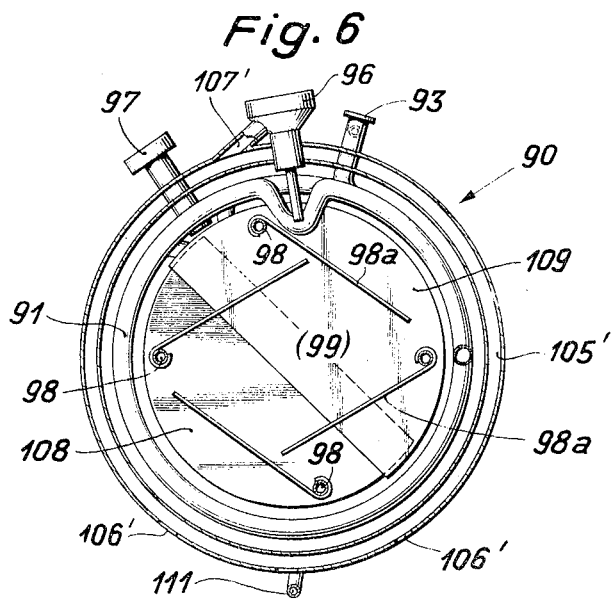

In FIGS. 6 and 7, yet another embodiment is shown, generally designated by 90. It comprises a coil 91, closed by walls 94 which form a fire chamber 99. A burner 96 and an escape for waste gases, 97, is provided in said chamber. Coil 91 has an inlet opening 92 and an outlet opening 93. End walls 104 form end chambers 101 which are connected by pipes 98 and have inlet and outlet openings 102 and 103, respectively. The entire heating device is enclosed in a jacket 105' which is connected at 107' with burner 96 and which has peripheral air inlet openings 106' at the side opposite therefrom.

Air for sustaining combustion passes over the surface of the coil and enters the burner thereafter. The coil is further shunted by a pipe 111 leading from the inlet 92 to the outlet 93. In this pipe, there is a control valve 112 coupled to the operation of the motor (not shown) for burner 96. There is also a conventional heat-control switch 114 in the coil, which likewise cooperates with the motor for the burner. By projecting the shunting pipe 111, it is accomplished that the vessel is heated, or maintained at a desired temperature, respectively, when no water for consumption is withdrawn at 93. The coil is maintained at a given temperature by means of pipe 111, so that end chambers 101 will always have the desired temperature.

As may be seen from FIG. 7, burner 96 and escape opening 97 are staggered with respect to each other in order to cause the hot gases emerging from burner 96 to circulate repeatedly, as indicated by broken line 120, first in downward direction, then upwardly, again downwardly and finally to the outlet 97. At the connecting tubes 98, guide means or baffles 98a are provided which enhance the circulation of the gases. It is also possible to arrange vertical guide plates 108 and 109 in the fire chamber in order to cause circulation or spiral movement in more than one plane. The path of the heating fluid and of the waste gases is shown by a broken line 120 between the inlet and outlet openings 96 and 97, respectively, about guide plates 108 and 109. The fire chambers 19, 29, 49, 69, 69b, 69c and 99 are essentially formed by the closely adjacent windings of a coiled tube in combination with end walls on both sides. Furthermore, a shell surrounding the outer periphery of the coil can be provided, which is a part of the shell forming the cylindrical walls of the other chamber, as indicated in the figures.

Further in a shunting pipe, as shown at 11 in FIGURE 7, can be provided for the end chambers or for every chamber or coil section of the different embodiment, if desired or needed.

What is claimed is:

1. A heating apparatus with through-flow device, comprising, in combination,
    (a) a coiled tube having a plurality of continuous helical windings in closely adjacent vertical planes and forming a through-flow liquid circuit for heating purposes;
    (b) said coiled tube being closed by two lateral end walls and forming the circumference of a fire chamber with the inner wall of said coiled tube and with the inner surfaces of said walls;
    (c) burner means for heating said fire chamber by means of gas or oil;
    (d) portions of said coiled tube defining therebetween circumferential openings, one opening forming an inlet for receivnig said burner means having one direction, and another circumferentially offset opening constituting an escape outlet for waste gases in substantially the opposite direction;
    (e) means for directing the flame of said burner means tangentially in said one direction against said inner wall of the coiled tube, said waste gases flowing thereafter in a direction concentric with said coiled tube and in said vertical planes of the windings for at least almost a full circle, and for radially discharging said waste gases from said fire chamber in said opposite direction; and
    (f) intermediate walls arranged parallel to said end walls and forming at least two outer chambers for liquid heating;
        said fire chamber being centrally located between said outer chambers, said coiled tube being arranged to pass through at least one of said outer chambers, and at least one liquid circuit, independent from that of said coiled tube, passing through at least one of said outer chambers.

2. The heating apparatus according to claim 1, further comprising a shunting connection and valve control means for short-circuiting said liquid circuit of the coiled tube so as to compensate for low water consumption.

3. The heating appatarus according to claim 1, further comprising an outer jacket surrounding said coiled tube and said outer chambers, and serving for the circulation of air admitted to said burner means.

4. A heating apparatus with through-flow device, comprising a coiled tube having a single continuous helical path and closely adjacent windings, said coiled tube constituting a through-flow liquid circuit for heating purposes; a fire chamber delimited at its outer circumference by said windings and closed by lateral end walls; at least two liquid chambers contiguous with said end walls, at least one additional liquid circuit passing through said liquid chambers; and burner means for heating said fire chamber by means of a combustible fluid; portions of said windings defining therebetween circumferential openings, one opening forming an inlet for said fluid, and another circumferentially offset opening being an escape outlet for waste gases; said burner means being arranged for directing its flame initially in tangential direction against said windings and thereafter flowing said waste gases in a direction concentric with said coiled tube for at least almost a full circle, and for discharging said waste gases in radial direction from said fire chamber.

5. The heating apparatus according to claim 4, further comprising baffle means for controlling the path of said flame in said fire chamber.

6. The heating apparatus according to claim 5, wherein said baffle means includes at least one pair of plates substantially parallel with the direction of said inlet and said outlet openings so as to impart to said flame path a spiral configuration in more than one plane.

7. The heating apparatus according to claim 4, wherein said coiled tube is arranged to traverse both of said liquid chambers, said adidtional liquid circuit being independent from that of said coiled tube and including conduit means interconnecting said liquid chambers for serial flow of a liquid therethrough.

8. The heating apparatus according to claim 4, further comprising shunt means and valve control means connected to said liquid circuit of the coiled tube, whereby low water consumption can be compensated in said aforementioned liquid circuit.

9. The heating apparatus according to claim 4, further comprising an outer jacket surrounding said coiled tube and said liquid chambers, and serving for the circulation of air admitted to said burner means.

10. The heating apparatus according to claim 4, wherein said liquid chambers are on opposite sides of said fire chamber, each liquid chamber having one of said additional liquid circuits, said additional liquid circuits being independent of each other and of said liquid circuit of the coiled tube.

11. The heating apparatus according to claim 4, wherein said fire chamber has at least two separate compartments, said burner means has elements provided in each of said compartments, said inlet and said outlet openings being connected to each of said compartments, one of said liquid chambers being arranged on either side of said compartments, at least one of said additional liquid circuits passing through a single liquid chamber while at least another one of said additional liquid circuits includes conduit means interconnecting two of said liquid chambers for serial flow of a liquid therethrough, and further comprising means for selectively operating said burner elements in the respective fire-chamber compartments.

12. The heating apparatus according to claim 4, further comprising means for introducing air into said fire chamber, said inlet opening being laterally offset from said outlet opening in addition to said circumferentially offset arrangement.

13. The heating apparatus according to claim 12, further comprising conduit means interconnecting said liquid chambers for serial flow of a liquid through said additional liquid circuit, and shunting conduit means connected to said coiled tube and including valve means for controlling the through-flow of said liquid circuit of the coiled tube in case of low water consumption.

14. The heating apparatus according to claim 13, wherein said air-introducing means includes an outer jacket connected with said burner means and having air inlet openings at the side of said jacket opposite from said burner means, and further comprising guide means in said fire chamber for causing circulation of said flame in more than one plane.

15. A heating apparatus with through-flow device, comprising, in combination,
  (a) a coiled tube having a plurality of continuous helical windings in closely adjacent arrangement and forming a through-flow liquid circuit for heating purposes;
  (b) said coiled tube being closed by two lateral end walls and forming with its inner wall the circumference of a fire chamber within said closed tube;
  (c) said end walls each forming a closed liquid chamber, at least one additional liquid circuit passing liquid through said liquid chambers;
  (d) burner means for heating said fire chamber by means of gas or oil;
  (e) portions of said coiled tube defining therebetween circumferential openings, one opening forming an inlet for receiving said burner means and another, circumferentially offset, opening being an escape outlet for the products of combustion; and
  (f) said burner means being arranged for directing its flame initially in tangential direction against said inner wall of the coiled tube, and thereafter flowing said products of combustion in a direction concentric with said coiled tube for at least almost a full circle, and for discharging said products of combustion in radial direction through said outlet.

16. The heating apparatus according to claim 15, further comprising guide means for limiting the path of said flame in said fire chamber, particularly between said inlet and said outlet openings.

17. The heating apparatus according to claim 15, wherein there are two liquid chambers, one of which has a separate liquid circuit serially connected with said liquid circuit of the coiled tube.

References Cited by the Examiner

UNITED STATES PATENTS

| 1,903,807 | 4/1933 | Doble | 122—250 |
| 2,567,696 | 9/1951 | Kessler | 122—322 X |

FOREIGN PATENTS

| 135,049 | 3/1901 | Germany. |
| 744,949 | 2/1956 | Great Britain. |

KENNETH W. SPRAGUE, *Primary Examiner.*

PERCY L. PATRICK, FREDERICK L. MATTESON, Jr., *Examiners.*

N. R. WILSON, *Assistant Examiner.*